United States Patent
Matsuno et al.

(10) Patent No.: US 6,796,894 B1
(45) Date of Patent: Sep. 28, 2004

(54) VEHICULAR AIR CONDITIONING APPARATUS

(75) Inventors: Takayoshi Matsuno, Okazaki (JP); Yoshinori Okuno, Okazaki (JP); Yasushi Kato, Toyota (JP); Takuya Higashiura, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 106 days.

(21) Appl. No.: 10/130,049

(22) PCT Filed: Nov. 16, 2000

(86) PCT No.: PCT/IB00/01683

§ 371 (c)(1),
(2), (4) Date: Aug. 9, 2002

(87) PCT Pub. No.: WO01/38115

PCT Pub. Date: May 31, 2001

(30) Foreign Application Priority Data

Nov. 24, 1999 (JP) .................................. 11-332506

(51) Int. Cl.$^7$ .................................................. B60H 1/00
(52) U.S. Cl. ......................................... 454/139; 165/41
(58) Field of Search ................................ 454/139, 140, 454/141, 143; 165/41, 42, 202, 203, 204

(56) References Cited

U.S. PATENT DOCUMENTS

| 2,315,636 A | * | 4/1943 | McCollum ................ 454/140 |
| 2,817,282 A | * | 12/1957 | Dolison ....................... 454/139 |
| 4,721,032 A | * | 1/1988 | Sakamoto ................... 454/146 |
| 5,341,652 A | * | 8/1994 | Tajiri et al. .................... 62/244 |
| 5,447,469 A | | 9/1995 | Dausch et al. .............. 454/139 |
| 5,934,988 A | | 8/1999 | Fischer ....................... 454/121 |
| 6,554,695 B2 | * | 4/2003 | Elliot ........................ 454/139 |

FOREIGN PATENT DOCUMENTS

| DE | 37 14 771 | 12/1988 |
| DE | 42 43 165 | 6/1994 |
| EP | 0 560 673 | 9/1993 |
| EP | 0 713 792 | 5/1996 |
| JP | 5-22113 | 3/1993 |
| JP | 10-250342 | 9/1998 |

OTHER PUBLICATIONS

Patent Abstracts of Japan, vol. 011, No. 123 (M–581), Apr. 17, 1987 & JP 61 263822 A (Nippon Denso Co Ltd), Nov. 21, 1986.

* cited by examiner

Primary Examiner—Derek Boles
(74) Attorney, Agent, or Firm—Kenyon & Kenyon

(57) ABSTRACT

An air conditioning apparatus for a vehicle in which an engine room (14) and a passenger compartment (15) are separated by a dash panel (1), the vehicular air-conditioning apparatus having a conditioned air blowout opening (4) and a passenger compartment internal air suction opening (5) that are opened at a side of the passenger compartment (15), the passenger compartment internal air suction opening (5) being provided in an upper portion of an instrument panel (2).

27 Claims, 13 Drawing Sheets

FLOW OF CONDITIONED AIR

<SYMBOL>

( o———, ⇨ ) INDICATE FACE/INTERNAL AIR MODE
( o====, ⇍⇛ ) INDICATE DEFROSTER/INTERNAL AIR MODE

VEHICULAR AIR CONDITIONING APPARATUS

FIELD OF THE INVENTION

The present invention relates to an improvement in a vehicular air-conditioning apparatus.

BACKGROUND OF THE INVENTION

As a technology related to a vehicular air-conditioning apparatus, there is a technology disclosed in Japanese Patent Application Laid-Open No. HEI 10-250342. This technology will be described with reference to FIG. 16. FIG. 16 is an estimated diagram schematically illustrating a vehicular air-conditioning apparatus disclosed in the Japanese Patent Application Laid-Open No. HEI 10-250342 and a section of a vehicle in which the vehicular air-conditioning apparatus is disposed. The drawing is termed "estimated diagram" because the drawing shows an instrument panel (dashboard) although Japanese Patent Application Laid-Open No. HEI 10-250342 provides a description of an instrument panel but does not provide a drawing thereof.

As shown in FIG. 16, an engine room 134 and a passenger compartment 135 are separated by a dash panel 121. A floor 132 extends below the dash panel 121. A roof 131 is mounted via a front window 130 above the dash panel 121. An instrument panel 122 is disposed from the dash panel 121 toward a passenger compartment-side. The instrument panel 122 is disposed so that a predetermined space is provided between the instrument panel 122 and an occupant (not shown).

A lower portion of the instrument panel 122 has an opening, thereby forming a passenger compartment internal air suction opening 125. A conditioned air blowout opening 124 is formed in an upper portion of the instrument panel 122.

A blower unit 123 and an airconditioner unit (not shown) are disposed inside the instrument panel 122. The blower unit 123 has a blower internal air suction opening 126 at a site in the unit that is located upward and rearward with respect to the vehicle, and has a blower external air suction opening 129 at a site in the unit located upward and forward with respect to the vehicle.

The operation of the above-described technology will be described. Conditioned air via the blower unit 123 and the airconditioner unit (not shown) is blown out of the conditioned air blowout opening 124 into the passenger compartment 135, and flows via below the front window shield 130 and below the roof 131, thereby cooling an upper body of an occupant (not shown). After that, conditioned-air reverses in a rearward portion of the passenger compartment 135, and flows along and above the floor 132 forward with respect to the vehicle, thereby cooling a lower body of the occupant. Conditioned air is drawn into the passenger compartment internal air suction opening 125 formed in a lower portion of the instrument panel 122. Due to the above-described sequential flow of conditioned air, the occupant is cooled.

However, in the above-described technology, conditioned air flows into areas where sensual effect is less (in particular, around the occupant's feet), the vicinity of the floor 132, and the like. Cooling such areas gives rise to a problem of consuming an unnecessary power.

DISCLOSURE OF THE INVENTION

It is an object of the invention to provide a vehicular air-conditioning apparatus that effectively cools an occupant at reduced power consumption.

A first aspect of the invention is a vehicular air-conditioning apparatus that is applied to a vehicle in which an engine room and a passenger compartment are separated by a dash panel and that has a conditioned air blowout opening and a passenger compartment internal air suction opening that are opened at a side of the passenger compartment, characterized in that the passenger compartment internal air suction opening is disposed so that conditioned air is circulated mainly around an occupant's upper body.

A second aspect of the invention is a vehicular air-conditioning apparatus that is applied to a vehicle in which an engine room and a passenger compartment are separated by a dash panel and that has a conditioned air blowout opening and a passenger compartment internal air suction opening that are opened at a side of the passenger compartment, characterized in that the passenger compartment internal air suction opening is provided in an upper portion of an instrument panel.

In the above-described first and second aspects, the conditioned air blowout opening may be provided below the passenger compartment internal air suction opening.

In the above-described aspects, a cover may be mounted on a lower face of an instrument panel.

In the above-described aspects, the passenger compartment internal air suction opening and a blower internal air suction opening may be connected and an intake passage may be shielded by a shield member so as to prevent internal air present in an instrument panel from entering the intake passage.

DETAILED DESCRIPTION

Figure 1:
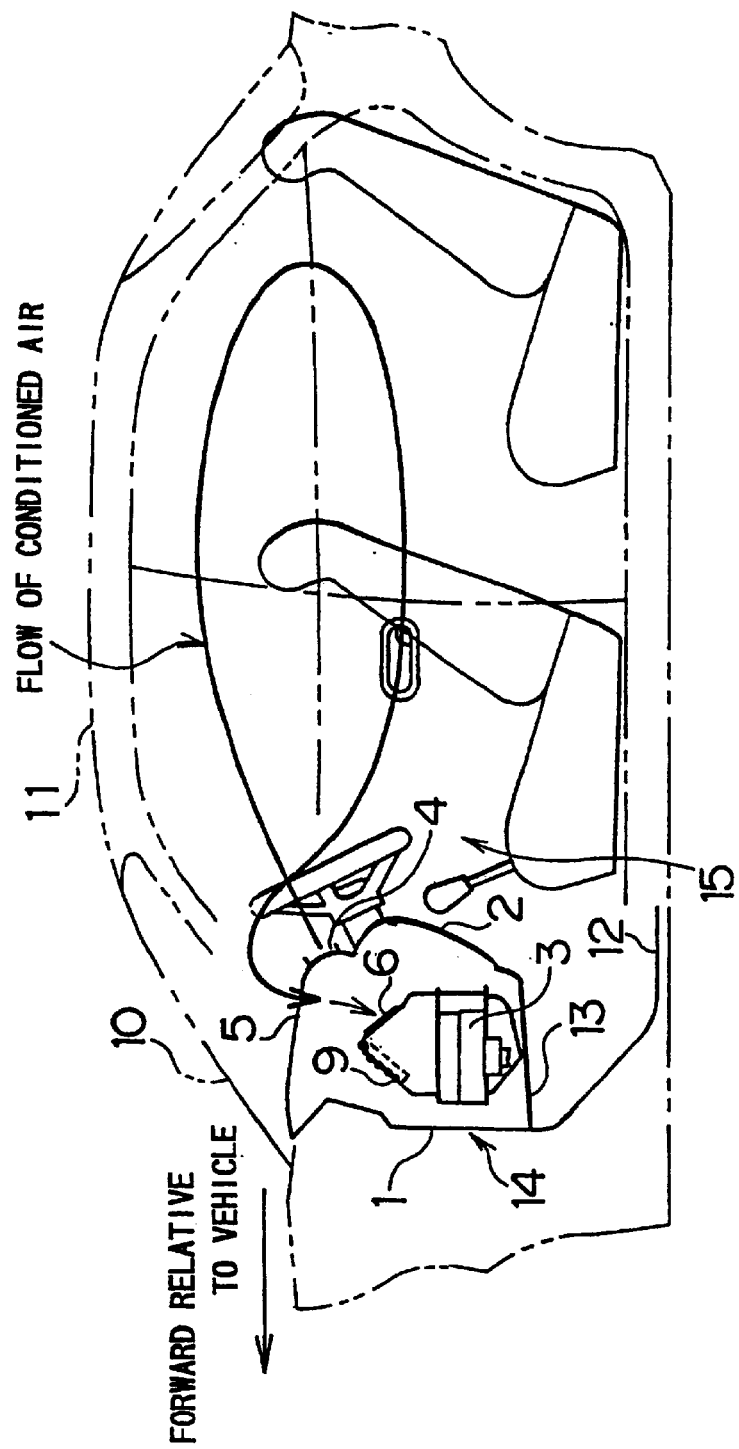
FIG. 1 is a schematic diagram of a vehicular air-conditioning apparatus in accordance with a first embodiment of the invention and a section of a vehicle in which the vehicular air-conditioning apparatus is disposed.

Preferred embodiments of the invention will be described hereinafter with reference to the accompanying drawings. FIG. 1 is a schematic diagram of a vehicular air-conditioning apparatus in accordance with a first embodiment of the invention and a section of a vehicle in which the vehicular air-conditioning apparatus is disposed. As shown in FIG. 1, an engine room 14 and a passenger compartment 15 are separated by a dash panel 1. A floor 12 extends below the dash panel 1. A roof 11 is disposed above the dash panel 1 via a front window 10. An instrument panel 2 is disposed from the dash panel 1 toward a passenger compartment-side. The instrument panel 2 is disposed so that a predetermined space is provided between the instrument panel 2 and an occupant (not shown).

A lower portion of the instrument panel 2 is covered with a cover 13, whereby flow of conditioned air from below the instrument panel 2 to the inside thereof is blocked. A conditioned air blowout opening 4 is formed in an upper portion of the instrument panel 2. A passenger compartment internal air suction opening 5 is formed in an upper portion of the instrument panel 2 that is located above the conditioned air blowout opening 4.

A blower unit 3 and an airconditioner unit (not shown) are disposed inside the instrument panel 2. The blower unit 3 has a blower internal air suction opening 6 at a site in the unit that is located upward and rearward with respect to the vehicle, and has a blower external air suction opening 9 at a site in the unit located upward and forward with respect to the vehicle.

The operation of the first embodiment of the invention will be described. Conditioned air via the blower unit 3 and the airconditioner unit (not shown) is blown out of the conditioned air blowout opening 4 into the passenger compartment 15, and flows via below the front window shield 10 and below the roof 11, thereby cooling an upper body of an occupant (not shown). After that, conditioned-air reverses in a rearward portion of the passenger compartment 15, and flows through a substantially middle portion of a height of the vehicle toward a forward portion of the vehicle, thereby cooling the an upper body of the occupant. Conditioned air is drawn into the passenger compartment internal air suction opening 5 formed in the upper portion of the instrument panel 2, and is then drawn into the blower 3. Due to the above-described sequential flow of conditioned air indicated in the drawing, cooling is performed mainly around the upper body of the occupant. A lower body of the occupant is weakly cooled by turbulence of conditioned air.

In the above-described vehicular air-conditioning apparatus in accordance with the first embodiment of the invention, the passenger compartment internal air suction opening 5 is disposed so as to circulate conditioned air around an upper body of an occupant, so that the occupant's upper body can be effectively cooled. A lower body, that is, a body portion where sensual effect is relatively small, and, in particular, the occupant's feet, are weakly cooled, so that the cooling heat load can be reduced without increases in mass or cost.

Since the passenger compartment internal air suction opening 5 is provided in an upper portion of the instrument panel 2, an occupant's upper body can be effectively cooled. Since a lower body, that is, a body portion where sensual effect is relatively small, and, in particular, the occupant's feet, are weakly cooled, the cooling heat load can be reduced without increases in mass or cost.

Furthermore, since the conditioned air blowout opening 4 is provided below the passenger compartment internal air suction opening 5, conditioned air is blocked from flowing around an occupant's lower body, and flow of conditioned air can be concentrated around an occupant's upper body. Therefore, the cooling heat load caused by the cooling of the feet of an occupant or the floor 12 can be reduced.

Still further, since the cover 13 is mounted to a lower face of the instrument panel 2, suction of condition air via the lower face of the instrument panel 2 can be blocked. Therefore, the flow of conditioned air around the occupant's lower body can be reduced, and enhanced air streams around the occupant's upper body can be achieved, so that the cooling heat load can be reduced.

Further, since conditioned air is drawn via the passenger compartment internal air suction opening 5 formed in an upper face of the instrument panel 2, appliances (meters, audio, etc.) disposed inside the instrument panel 2 can be cooled, so that their performances are maintained and their lasting characteristics are improved.

By expanding the opening area of the conditioned air blowout opening 4, the blowout speed can be reduced so as to achieve a flow of conditioned air having reduced turbulence. Therefore, conditioned air can be concentrated around an occupant's upper body, so that the cooling heat load can be reduced.

A vehicular air-conditioning apparatus in accordance with a second embodiment of the invention will be described with reference to FIG. 2.

Figure 2:
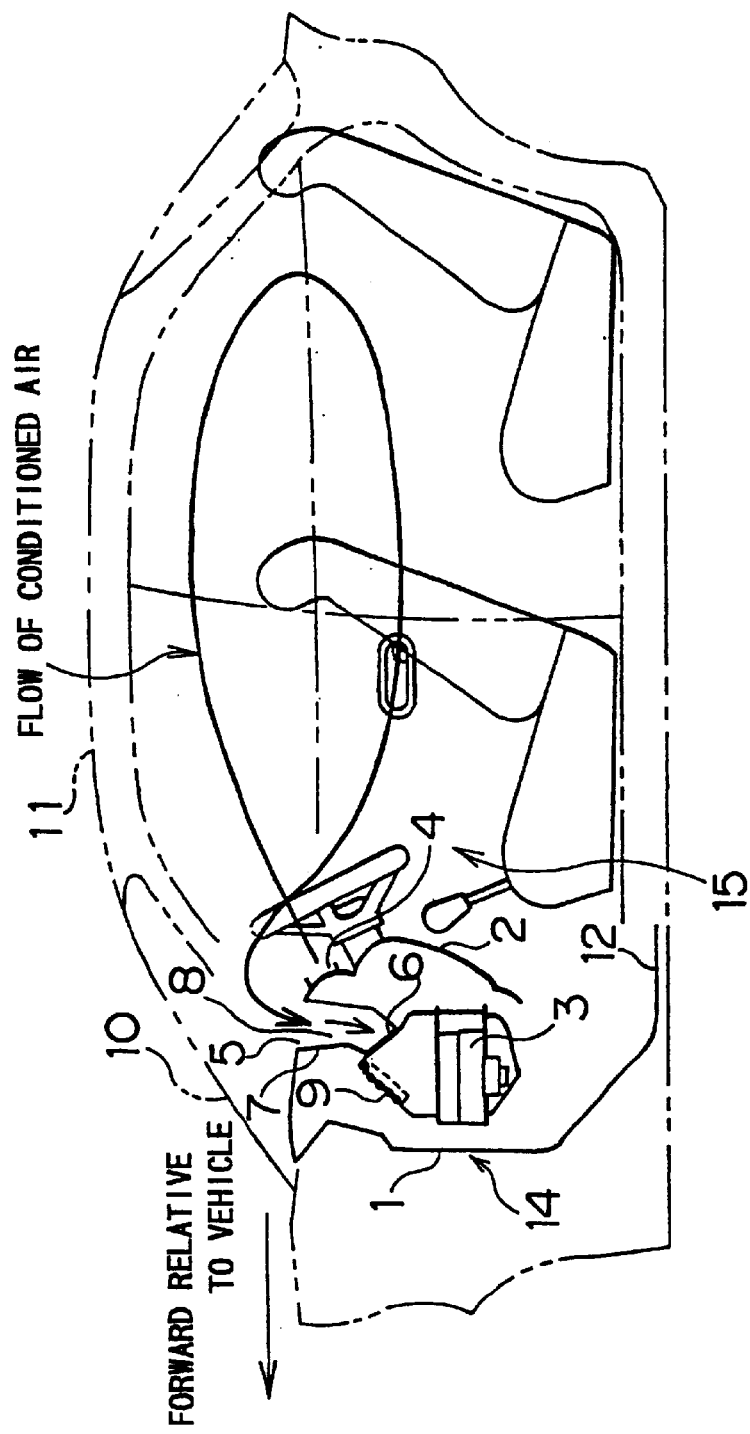
FIG. 2 is a schematic diagram of a vehicular air-conditioning apparatus in accordance with a second embodiment of the invention and a section of a vehicle in which the vehicular air-conditioning apparatus is disposed.

FIG. 2 is a schematic diagram of a vehicular air-conditioning apparatus in accordance with the second embodiment of the invention and a section of a vehicle in which the vehicular air-conditioning apparatus is disposed. Constructions equivalent to those shown in FIG. 1 are represented by the same reference characters, and the description thereof will be omitted since the description above is assumed to be sufficient for those constructions. Constructions different from those in FIG. 1 will mainly be described below.

As shown in FIG. 2, a suction passage 8 connecting between a passenger compartment internal air suction opening 5 and a blower internal air suction opening 6 of a blower unit 3 is shield from other spaces inside an instrument panel 2 by a shield member 7 such as a duct or the like. That is, the shield member 7 blocks air from flowing from inside the instrument panel 2 into the blower internal air suction opening 6. Therefore, high-temperature air in the instrument panel 2 is prevented from being drawn into the blower internal air suction opening 6.

In the vehicular air-conditioning apparatus shown in FIG. 2, the suction passage 8 connecting between the passenger compartment internal air suction opening 5 and the blower internal air suction opening 6 is shielded by the shield member 7 although a lower face of the instrument panel 2 is open. Therefore, suction of conditioned air into the blower internal air suction opening 6 from the lower face of the instrument panel 2 is impossible, so that the cooling heat load can be reduced despite a simple construction that does not employ a cover.

Improvement inventions of a passenger compartment internal air suction opening of a vehicular air-conditioning apparatus in accordance with the invention will be described with reference to FIGS. 3 to 13.

Figure 3:
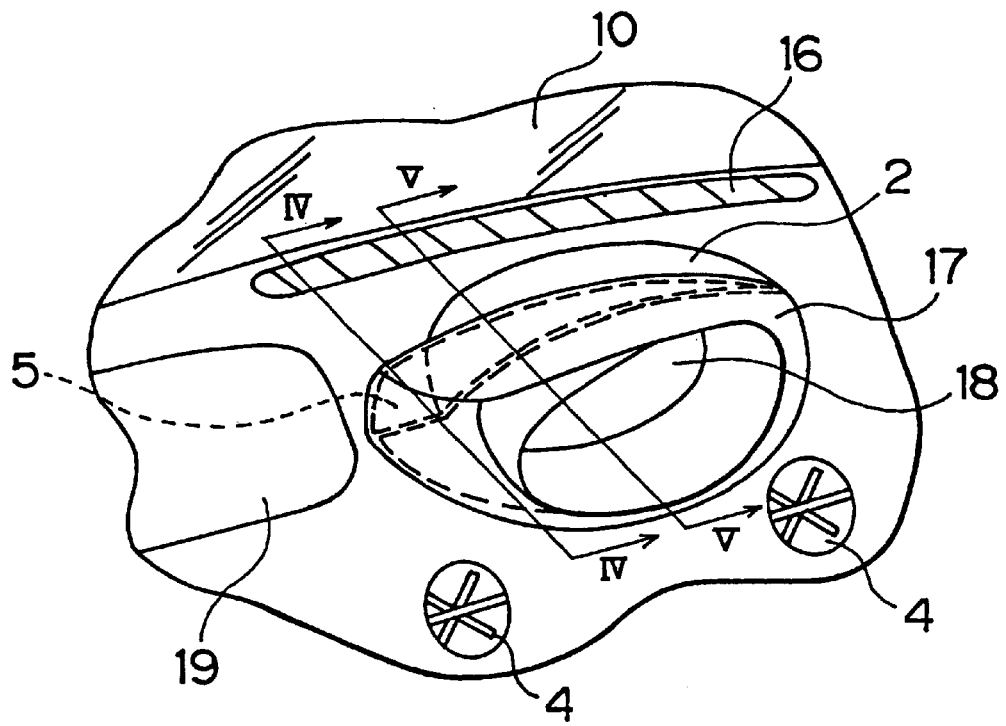
FIG. 3 is a partial perspective view of an instrument panel having a passenger compartment internal air suction opening in accordance with a third embodiment of the invention.

An instrument panel having a passenger compartment internal air suction opening of a vehicular air-conditioning apparatus in accordance with a third embodiment of the invention will be described with reference to FIGS. 3 to 6. FIG. 3 is a partial perspective view of an instrument panel having a passenger compartment internal air suction opening in accordance with the third embodiment of the invention.

As shown in FIG. 3, defroster nozzle blowout openings 16 are provided forward of an instrument panel 2 and rearward of a front window shield 10 with respect to the vehicle. An increased-size meter cluster 17 is disposed on the instrument panel 2 located forward of an occupant. Meters 18 are disposed in the meter cluster 17. Conditioned air blowout openings 4 are provided below the meter cluster 17. An airbag 19 is embedded at a side of the meter cluster 17.

A passenger compartment internal air suction opening 5 is provided in a face of the meter cluster 17 that is located forward with respect to the vehicle. The passenger compartment internal air suction opening 5 is open toward the front window shield 10. The opening area of the passenger compartment internal air suction opening 5 is set so that a large area is provided at a site where the meters 18 are disposed, and so that a small area is provided at a site where the meters 18 are not disposed. The passenger compartment internal air suction opening 5 serves as a suction opening for conditioned air that returns to the vehicular air-conditioning apparatus after circulating in the passenger compartment and cooling an occupant's upper body.

Figure 4:
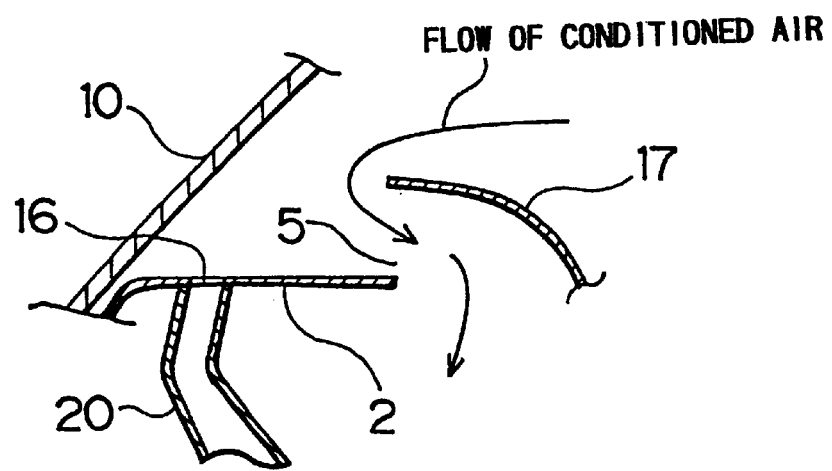
FIG. 4 is a sectional view taken on line IV—IV in FIG. 3.
Figure 5:
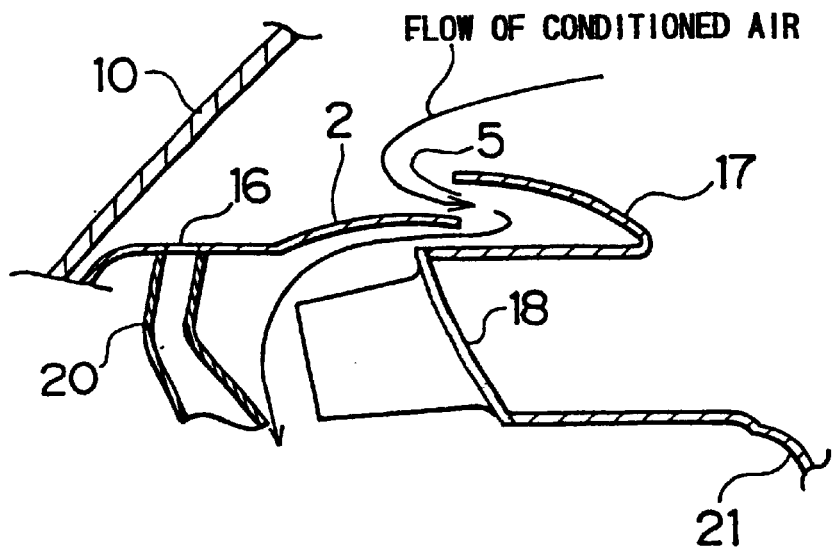
FIG. 5 is a sectional view taken on line V—V in FIG. 3.

Further description will be made with reference to FIGS. 4 and 5. FIG. 4 is a sectional view taken on line IV—IV in FIG. 3, and FIG. 5 is a sectional view taken on line V—V in FIG. 3. As shown in FIG. 4, the passenger compartment internal air suction opening 5 is formed between a forward end portion of the meter cluster 17 and the instrument panel 2, and has a large opening area. Since the passenger compartment internal air suction opening 5 has a construction that has a large opening area, the passenger compartment internal air suction opening 5 is able to strongly draw flows of conditioned air.

Defroster nozzle blowout openings 16 are disposed forward of the passenger compartment internal air suction opening 5 with respect to the vehicle and rearward of the front window shield 10 with respect to the vehicle. The defroster nozzle blowout openings 16 are connected to a defroster duct 20 extending in the instrument panel 2.

The passenger compartment internal air suction opening 5 shown in FIG. 5 is also formed between a forward end portion of the meter cluster 17 and the instrument panel 2. The meter cluster 17 is connected to a lower portion 21 of the instrument panel. The passenger compartment internal air suction opening 5 shown in FIG. 5 has a construction that has an opening area smaller than the opening area of the passenger compartment internal air suction opening 5 shown in FIG. 4. Since the passenger compartment internal air suction opening 5 has a construction having a small opening area, both arrangement of the meters 18 and suction of conditioned air can be favorably achieved.

Figure 6:
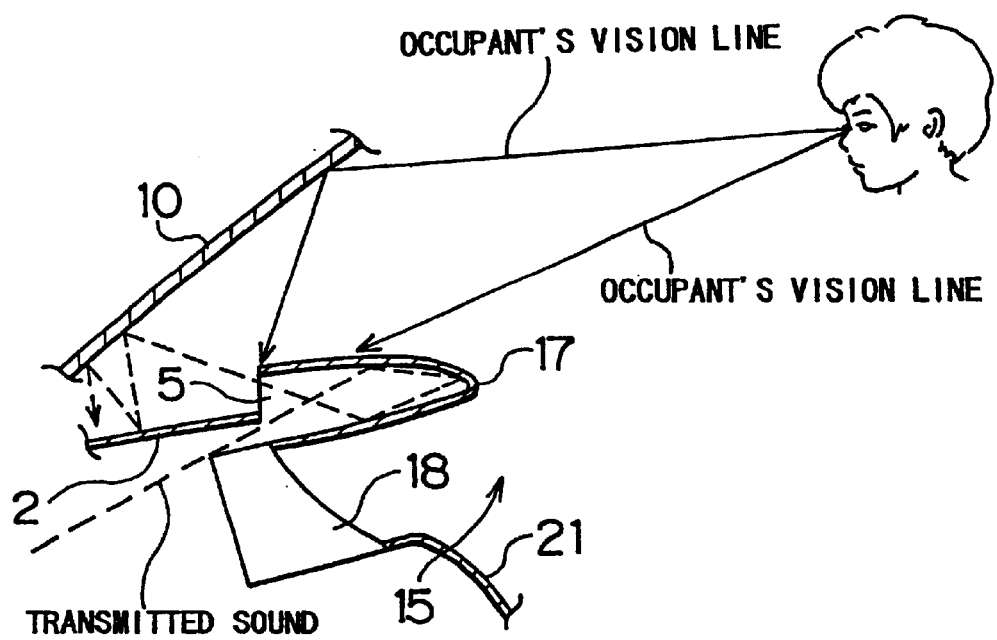
FIG. 6 is a sectional view for illustrating advantages of the instrument panel having the passenger compartment internal air suction opening in accordance with the third embodiment of the invention.

Advantages of the instrument panel provided with the passenger compartment internal air suction opening 5 in accordance with the third embodiment of the invention will be explained with reference to FIG. 6. FIG. 6 is a sectional view for illustrating advantages of the instrument panel provided with the passenger compartment internal air suction opening in accordance with the third embodiment of the invention. As shown in FIG. 6, the passenger compartment internal air suction opening 5 is not visible from an occupant (driver) if the passenger compartment internal air suction opening 5 is within the range of sight of the occupant, so that design characteristics are not degraded. Furthermore, the passenger compartment internal air suction opening 5 is not visible as a reflection in the front window shield 10, so that the passenger compartment internal air suction opening 5 hardly becomes a hindrance to the driving. Still further, sounds transmitted from the engine room propagate while being reflected within the meter cluster 17 or between the front window shield 10 and the instrument panel 2, and do not directly propagate into the passenger compartment 15, so that noise can be curbed to a low level.

Figure 7:
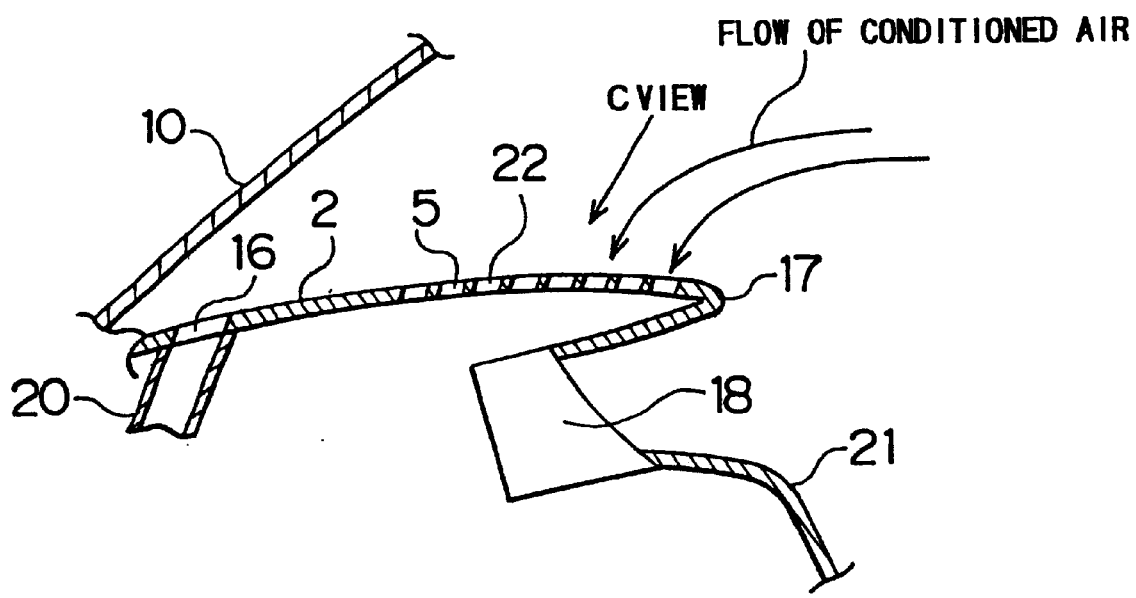
FIG. 7 is a partial sectional view of an instrument panel having a passenger compartment internal air suction opening in accordance with a fourth embodiment of the invention.
Figure 8:
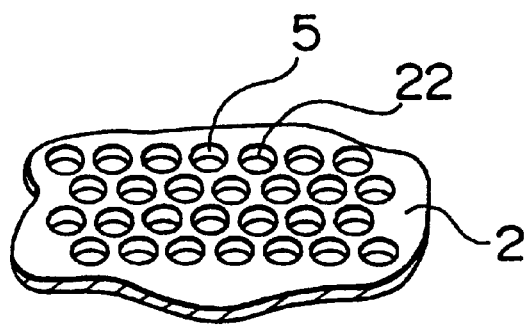
FIG. 8 is a plan view in a view C indicated in FIG. 7.

An instrument panel having a passenger compartment internal air suction opening in accordance with a fourth embodiment of the invention will be described with reference to FIGS. 7 and 8. FIG. 7 is a partial sectional view of an instrument panel having a passenger compartment internal air suction opening in accordance with the fourth embodiment of the invention. FIG. 8 is a plan view in a view C indicated in FIG. 7. As shown in FIGS. 7 and 8, a passenger compartment internal air suction opening 5 is formed by many suction holes 22 formed in an upper face of the instrument panel 2. As shown in FIG. 7, a defroster nozzle blowout opening 16 is disposed forward of the passenger compartment internal air suction opening 5 with respect to the vehicle and rearward of a front window shield 10 with respect to the vehicle.

According to the passenger compartment internal air suction opening 5 in accordance with the fourth embodiment of the invention, since the passenger compartment internal air suction opening 5 is formed by the suction holes 22, there is no unnaturalness perceived if the passenger compartment internal air suction opening 5 is seen by an occupant (driver). Thus, design characteristics are not degraded. Furthermore, if the passenger compartment internal air suction opening 5 is seen as a reflection in the front window shield 10, no unpleasant feeling is caused, so that the passenger compartment internal air suction opening 5 hardly becomes a hindrance to the driving. Still further, since the passenger compartment internal air suction opening 5 is not opened in such a direction that air blown out of the defroster nozzle blowout opening 16 is directly sucked, the performance of the defroster is not degraded.

Figure 9:
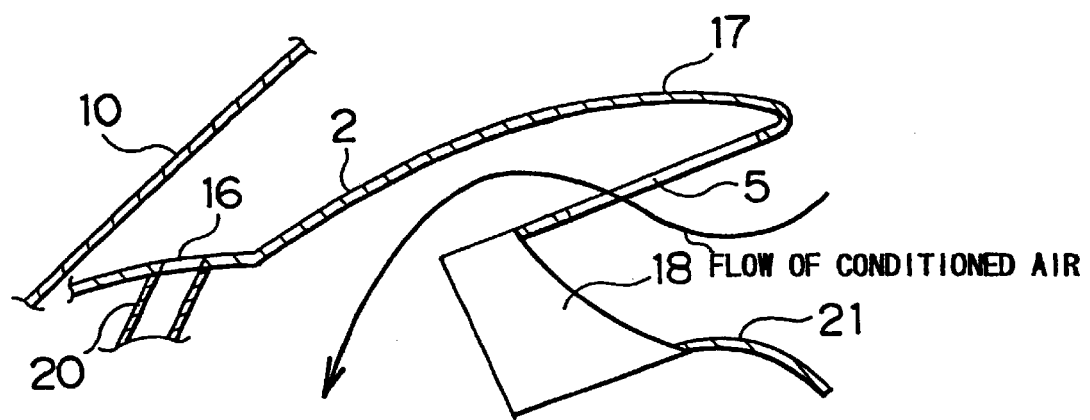
FIG. 9 is a partial sectional view of an instrument panel having a passenger compartment internal air suction opening in accordance with a fifth embodiment of the invention.

An instrument panel having a passenger compartment internal air suction opening in accordance with a fifth embodiment of the invention will be described with reference to FIG. 9. FIG. 9 is a partial sectional view of an instrument panel having a passenger compartment internal air suction opening in accordance with the fifth embodiment of the invention. As can be seen from the FIG. 9, a passenger compartment internal air suction opening 5 is formed so as to open in an inner face of a meter cluster 17 that is an upper face thereof in a vertical direction with respect to the vehicle. A defroster nozzle blowout opening 16 is disposed forward of the meter cluster 17 with respect to the vehicle and rearward of a front window shield 10 with respect to the vehicle.

According to the passenger compartment internal air suction opening 5 in accordance with the fifth embodiment of the invention, since the passenger compartment internal air suction opening 5 is formed so as to open an inner face of the meter cluster 17 that is an upper face thereof in the vertical direction with respect to the vehicle, the passenger compartment internal air suction opening 5 is not visible from an occupant (driver), so that design characteristics are not degraded. Furthermore, the passenger compartment internal air suction opening 5 is not visible as a reflection in the front window shield 10, and therefore does not become a hindrance to the driving. Still further, the passenger compartment internal air suction opening 5 is not along the route of flow of air blown out of the defroster nozzle blowout opening 16, so that the performance of the defroster is not degraded.

Figure 10:
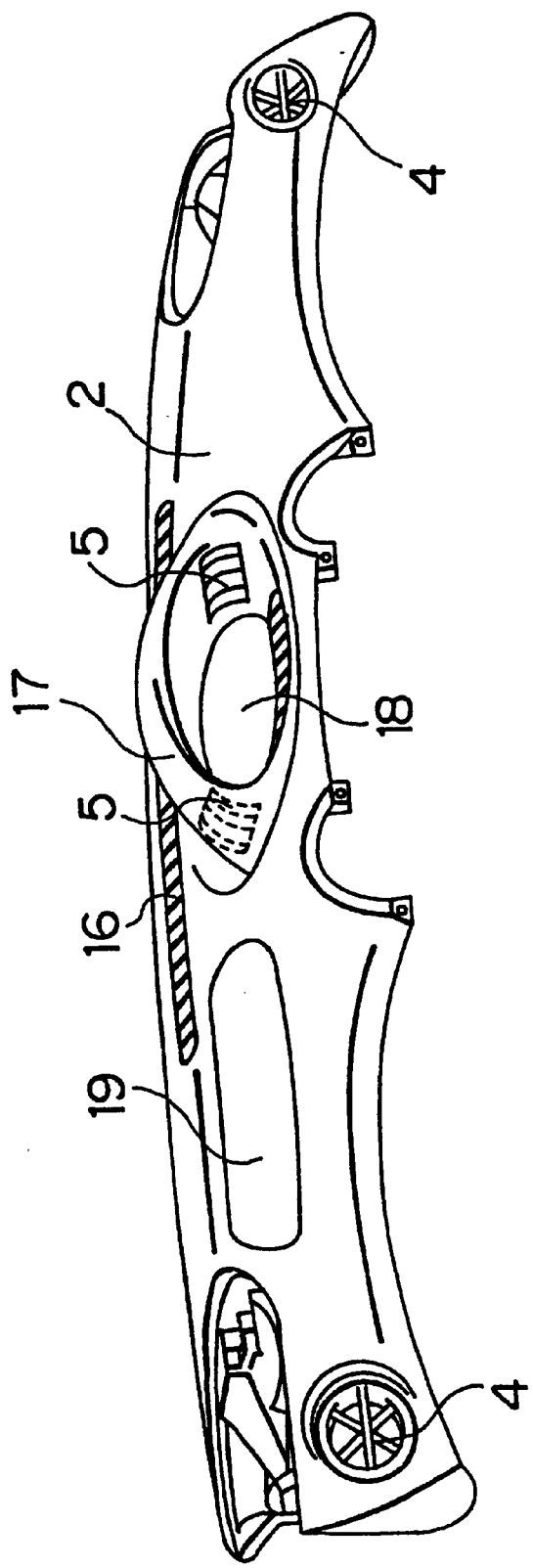
FIG. 10 is a partial perspective view of an instrument panel having a passenger compartment internal air suction opening in accordance with a sixth embodiment of the invention.

An instrument panel having a passenger compartment internal air suction opening in accordance with a sixth embodiment of the invention will be described with reference to FIG. 10. FIG. 10 is a partial perspective view of an instrument panel having passenger compartment internal air suction openings in accordance with a sixth embodiment of the invention. As shown in FIG. 10, the passenger compartment internal air suction openings 5 are formed so as to open in inner faces of a meter cluster 17 that are right and left-side faces thereof in right-and-left directions, i.e. the width direction of the vehicle. A defroster nozzle blowout opening 16 is disposed forward of the meter cluster 17 with respect to the vehicle and rearward of a front window shield 10 with respect to the vehicle.

According to the passenger compartment internal air suction opening 5 in accordance with the sixth embodiment of the invention, since the passenger compartment internal air suction openings 5 are formed so as to open in inner faces of the meter cluster 17 that are right and left-side faces of the meter cluster 17 in the right-and-left directions of the vehicle, the passenger compartment internal air suction openings 5 are not visible as reflections in the front window shield 10, and therefore do not become a hindrance to the driving. Furthermore, the passenger compartment internal air suction openings 5 are not along the route of flow of air blown out of the defroster nozzle blowout opening 16, so that the performance of the defroster is not degraded.

Figure 11:
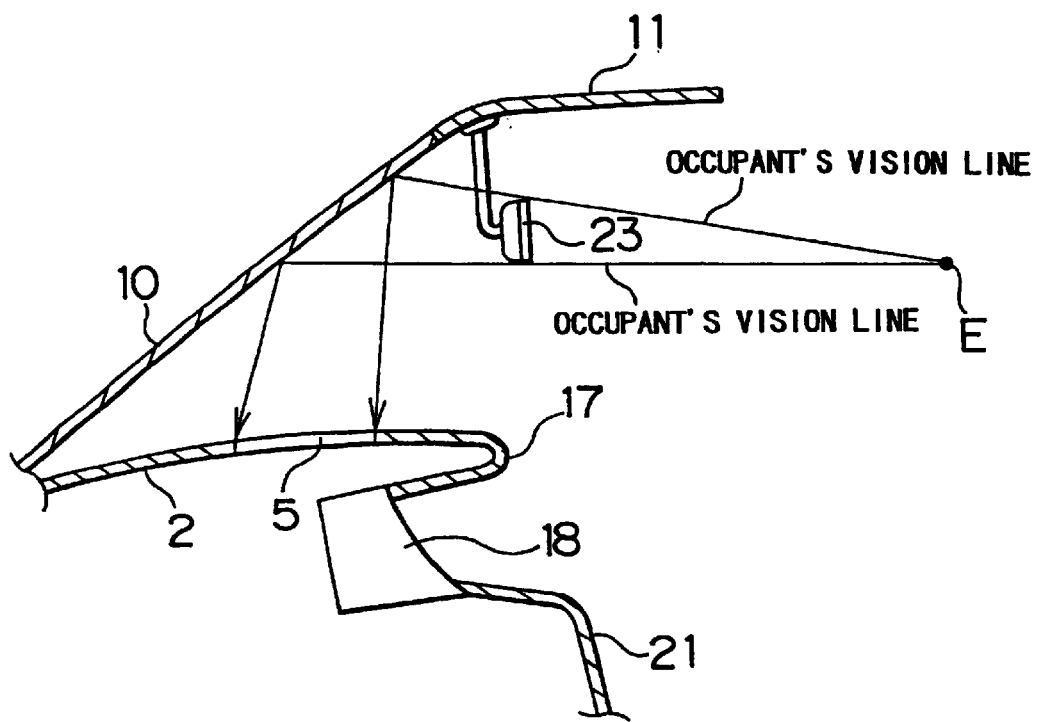
FIG. 11 is a partial sectional view of an instrument panel having a passenger compartment internal air suction opening in accordance with a seventh embodiment of the invention.
Figure 12:
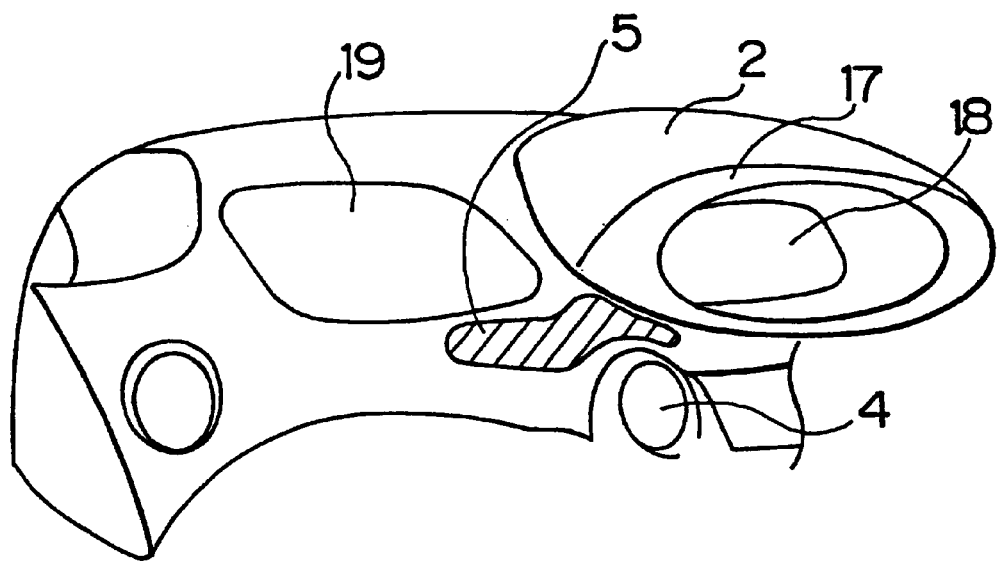
FIG. 12 is a partial perspective view of the instrument panel having the passenger compartment internal air suction opening in accordance with the seventh embodiment of the invention.

An instrument panel having a passenger compartment internal air suction opening in accordance with a seventh embodiment of the invention will be described with reference to FIGS. 11 and 12. FIG. 11 is a partial sectional view of an instrument panel having a passenger compartment internal air suction opening in accordance with the seventh embodiment of the invention. FIG. 12 is a partial perspective view of the instrument panel provided with the passenger compartment internal air suction opening in accordance with the seventh embodiment of the invention.

As shown in FIG. 11, the passenger compartment internal air suction opening 5 is formed within a predetermined area in the instrument panel 2 that is caused to be the blind spot by a rearview mirror 23, that is, an area whose view from an eye point E of an occupant via reflection on a front window shield 10 is blocked by the rearview mirror 23. FIG. 12 illustrates a state where the passenger compartment internal air suction opening 5 is formed within a predetermined area in the instrument panel 2 that is caused to be the blind spot by the rearview mirror 23.

According to the passenger compartment internal air suction opening 5 in accordance with the seventh embodiment of the invention, since the passenger compartment internal air suction opening 5 is formed within a predetermined area in the instrument panel 2 that is caused to be a blind spot by the rearview mirror 23, the passenger compartment internal air suction opening 5 is not visible as a reflection in the front window shield 10, and therefore does not become a hindrance to the driving.

Figure 13:
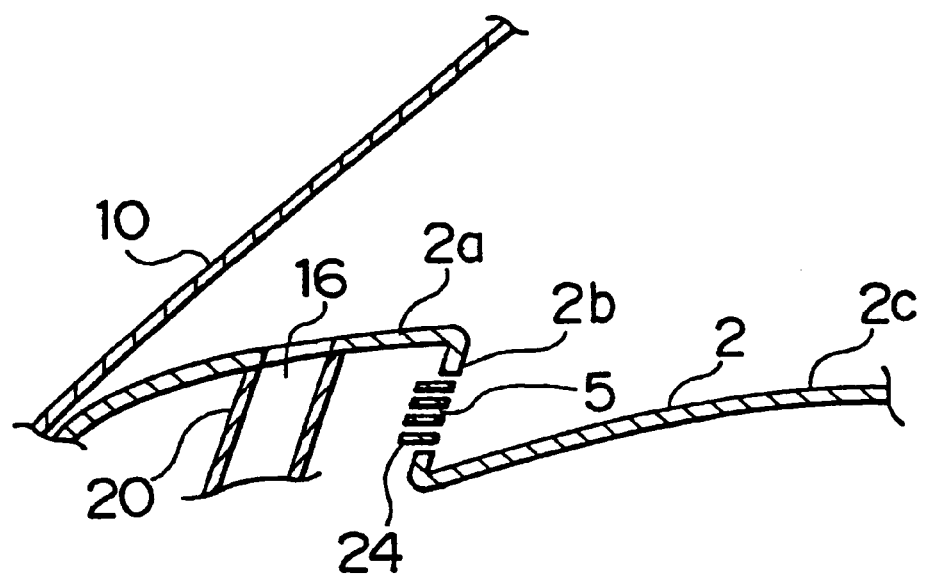
FIG. 13 is a partial sectional view of an instrument panel having a passenger compartment internal air suction opening in accordance with an eighth embodiment of the invention.

An instrument panel having a passenger compartment internal air suction opening in accordance with an eighth embodiment of the invention will be described with reference to FIG. 13. FIG. 13 is a partial sectional view of an instrument panel having a passenger compartment internal air suction opening 5 in accordance with the eighth embodiment of the invention. As shown in FIG. 13, an upper face of the instrument panel 2 has an upper instrument panel stage 2a that is formed forward in a fore-to-aft direction of the vehicle, a vertical wall 2b extending continuously from the upper instrument panel stage 2a and extending downward in a vertical direction of the vehicle, and a lower instrument panel stage 2c extending continuously from the vertical wall 2b and extending rearward in the fore-to-aft direction of the vehicle. A passenger compartment internal air suction opening 5 is formed by opening a portion of the vertical wall 2b and disposing fins 24 therein. A defroster nozzle blowout opening 16 is disposed forward of the instrument panel 2 with respect to the vehicle and rearward of a front window shield 10 with respect to the vehicle.

According to the passenger compartment internal air suction opening 5 in accordance with the eighth embodiment of the invention, since the passenger compartment internal air suction opening 5 is opened in the vertical wall 2b extending downward in the vertical direction of the vehicle from the upper instrument panel stage 2a, the passenger compartment internal air suction opening 5 is not visible as a reflection in the front window shield 10, and does not become a hindrance to the driving. Furthermore, since the passenger compartment internal air suction opening 5 is not along the route of flow of air blown out of the defroster nozzle blowout opening 16, the passenger compartment internal air suction opening 5 does not degrade the performance of the defroster.

Figure 14:
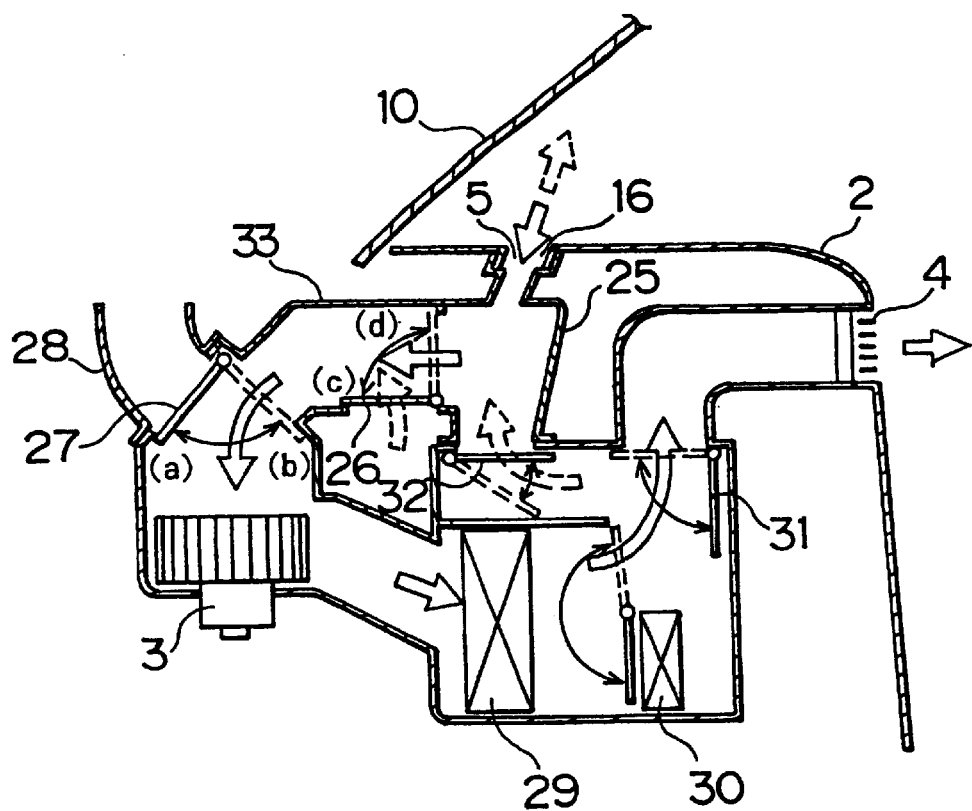
FIG. 14 is a schematic diagram of a vehicular air-conditioning apparatus in accordance with a ninth embodiment of the invention and a section of a vehicle in which the vehicular air-conditioning apparatus is disposed.

A vehicular air-conditioning apparatus in accordance with a ninth embodiment of the invention will be described with reference to FIG. 14. FIG. 14 is a schematic diagram of a vehicular air-conditioning apparatus in accordance with the ninth embodiment of the invention and a section of a vehicle in which the vehicular air-conditioning apparatus is disposed. The vehicular air-conditioning apparatus in accordance with the ninth embodiment of the invention shown in FIG. 14 uses a defroster nozzle blowout opening 16 as a passenger compartment internal air suction opening 5, thereby preventing deteriorations in appearance, window reflection, etc. caused by providing a dedicated passenger compartment internal air suction opening 5. The construction of the vehicular air-conditioning apparatus in accordance with the ninth embodiment of the invention will be described below.

As shown in FIG. 14, a defroster nozzle blowout opening 16 serving also as a passenger compartment internal air suction opening 5 is connected to a defroster nozzle 25, and an internal air duct 33. The internal air duct 33 is a duct disposed between an internal air suction opening of a blower unit 3 and a suction opening of the defroster nozzle 25. A subsidiary internal air damper 26 is disposed within the internal air duct 33. The subsidiary internal air damper 26 is a switching damper that selects whether to suck internal air from the defroster nozzle blowout opening 16 or to suck internal air present in the instrument panel 2. The subsidiary internal air damper 26 is driven by a motor, a link, and the like that are not shown in the drawings.

An internal/external air switching damper 27 is mounted upstream of the blower unit 3. The internal/external air switching damper 27 is a switching damper that selects whether to suck external air introduced via a cowl 28 or to suck internal air coming via the subsidiary internal air damper 26. Furthermore, a cooler unit 29 and a heater unit 30 are disposed downstream of the blower unit 3. Provided further downstream is a face damper 31. The face damper 31 is a switching damper that selects whether to blow conditioned air to a conditioned air blowout opening 4 or to blow conditioned air to a defroster damper 32. A portion downstream of the defroster damper 32 is constructed so as to connect to the defroster nozzle 25.

The operation of the vehicular air-conditioning apparatus in accordance with the ninth embodiment of the invention will be described. In FIG. 14, solid lines and solid-line arrows with regard to the various dampers indicate operations during a face-internal air mode. Dotted lines and dotted-line arrows with regard to the various dampers indicate operations during an internal air mode other than the face mode, for example, a defroster mode in FIG. 14.

First, the operation during a face blowout opening-and-internal air mode. Internal air (air inside the passenger compartment) is sucked from the passenger compartment internal air suction opening 5 (defroster nozzle blowout opening 16), and reaches the defroster nozzle 25. Internal air that has passed through the defroster nozzle 25 reaches the subsidiary internal air damper 26. Since the subsidiary internal air damper 26 has been switched to a position (c) indicated in the drawing, internal air passes through the subsidiary internal air damper 26, and reaches the internal air duct 33. Internal air that has passed through the internal air duct 33 reaches the internal/external air switching damper 27. Since the internal/external air switching damper 27 has been switched to a position (a) indicated in the drawing, internal air passes through the internal/external air switching damper 27, and reaches the face damper 31 via the blower unit 3, the cooler unit 29, and the heater unit 30. Since the face damper 31 has been opened, internal air passes through the face damper 31, and reaches the conditioned air blowout opening 4. Then, internal air is blow out of the conditioned air blowout opening 4 into the passenger compartment.

The operation during a mode of internal air and a blowout opening other than the face, for example, the defroster, will be described. Since the subsidiary internal air damper 26 has been switched to a position (d) indicated in the drawing, internal air (air in the passenger compartment) present in the instrument panel 2 passes through the subsidiary internal air damper 26, and reaches the internal air duct 33 as indicated by dotted-line arrows. Internal air that has passed through the internal air duct 33 reaches the internal/external air switching damper 27. Since the internal/external air switching damper 27 has been switched to a position (a) indicated in the drawing, internal air passes through the internal/external air switching damper 27, and reaches the face damper 31 via the blower unit 3, the cooler unit 29, and the heater unit 30. Since the face damper 31 has been closed, internal air cannot pass through the face damper 31, and reaches the defroster damper 32. Since the defroster damper 32 has been opened, internal air passes through the defroster damper 32, and flows via the defroster nozzle 25, and then is blown out of the defroster nozzle blowout opening 16 into the passenger compartment.

Next, the operation during the face blowout opening-and-external air mode will be described. External air introduced via the cowl 28 reaches the internal/external air switching damper 27. Since the internal/external air switching damper 27 has been switched to a position (b) indicated in the drawing, external air passes through the internal/external air switching damper 27, and reaches the face damper 31 via the blower unit 3, the cooler unit 29, and the heater unit 30. Since the face damper 31 has been opened, external air passes through the face damper 31, and reaches the conditioned air blowout opening 4, and is blown out of the conditioned air blowout opening 4 into the passenger compartment. The subsidiary internal air damper 26 may be switched to either one of the positions indicated by (c) and (d) in the drawing.

Next, the operation during a mode of external air and a blowout opening other than the face, for example, the defroster, will be described. External air introduced via the cowl 28 reaches the internal/external air switching damper 27. Since the internal/external air switching damper 27 has been switched to the position (b) indicated in the drawing, external air passes through the internal/external air switching damper 27, and reaches the face damper 31 via the blower unit 3, the cooler unit 29, and the heater unit 30. Since the face damper 31 has been closed, external air cannot pass through the face damper 31, and reaches the defroster damper 32. Since the defroster damper 32 has been opened, external air passes through the defroster damper 32, and reaches the defroster nozzle 25. Since at this moment the subsidiary internal air damper 26 has been switched to the position (d) indicated in the drawing, external air cannot pass through the subsidiary internal air damper 26, and is blown out of the defroster nozzle blowout opening 16 into the passenger compartment.

As described above, the vehicular air-conditioning apparatus in accordance with the ninth embodiment of the invention uses the conventionally employed defroster nozzle blowout opening 16 as a passenger compartment internal air suction opening 5, so that there is no need to set a dedicated passenger compartment internal air suction opening. Therefore, the apparatus is able to prevent deteriorations in appearance, window reflection, and the like.

Figure 15:
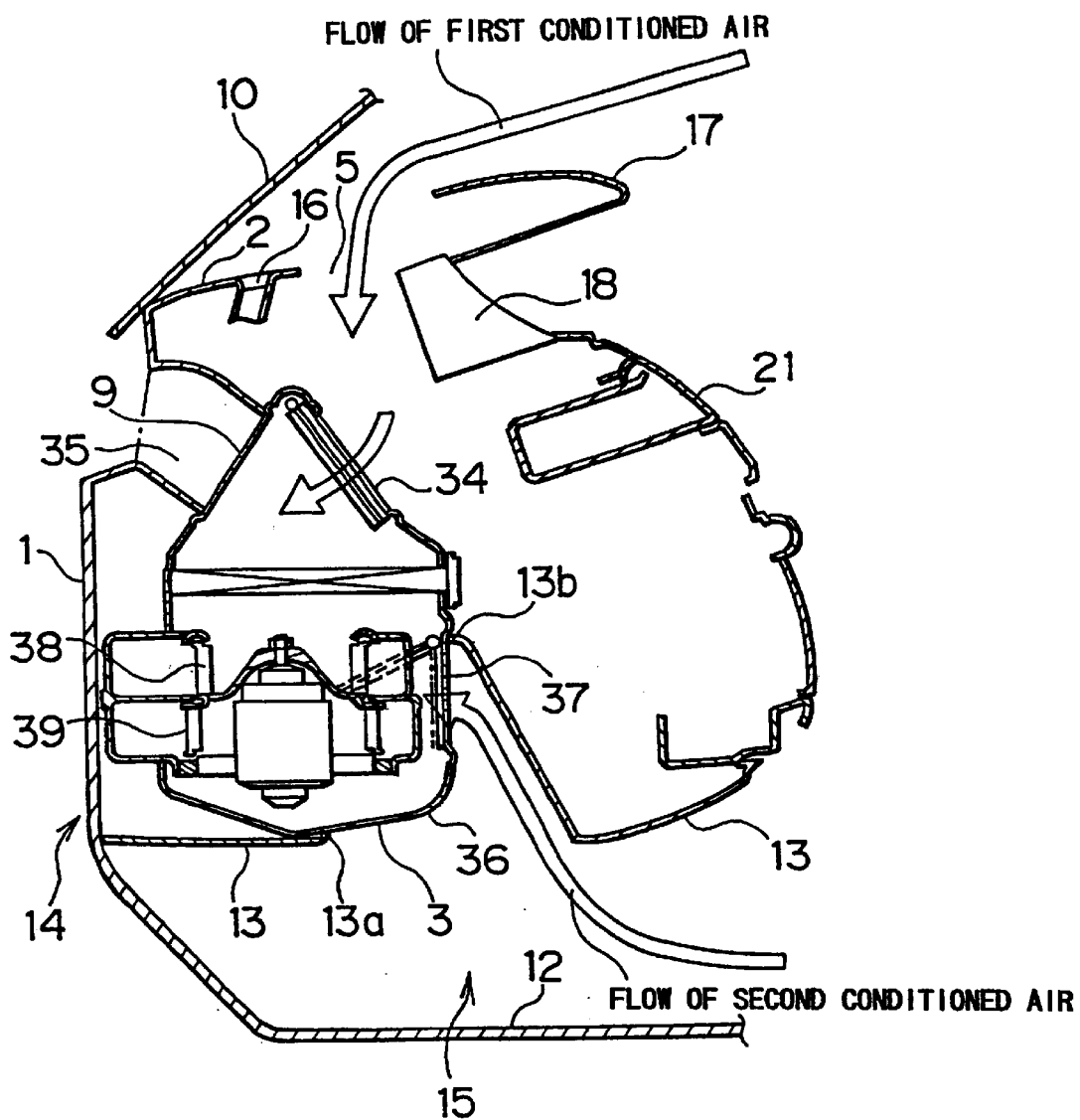
FIG. 15 is a schematic diagram of a vehicular air-conditioning apparatus in accordance with a tenth embodiment of the invention and a section of a vehicle in which the vehicular air-conditioning apparatus is disposed.
Figure 16:
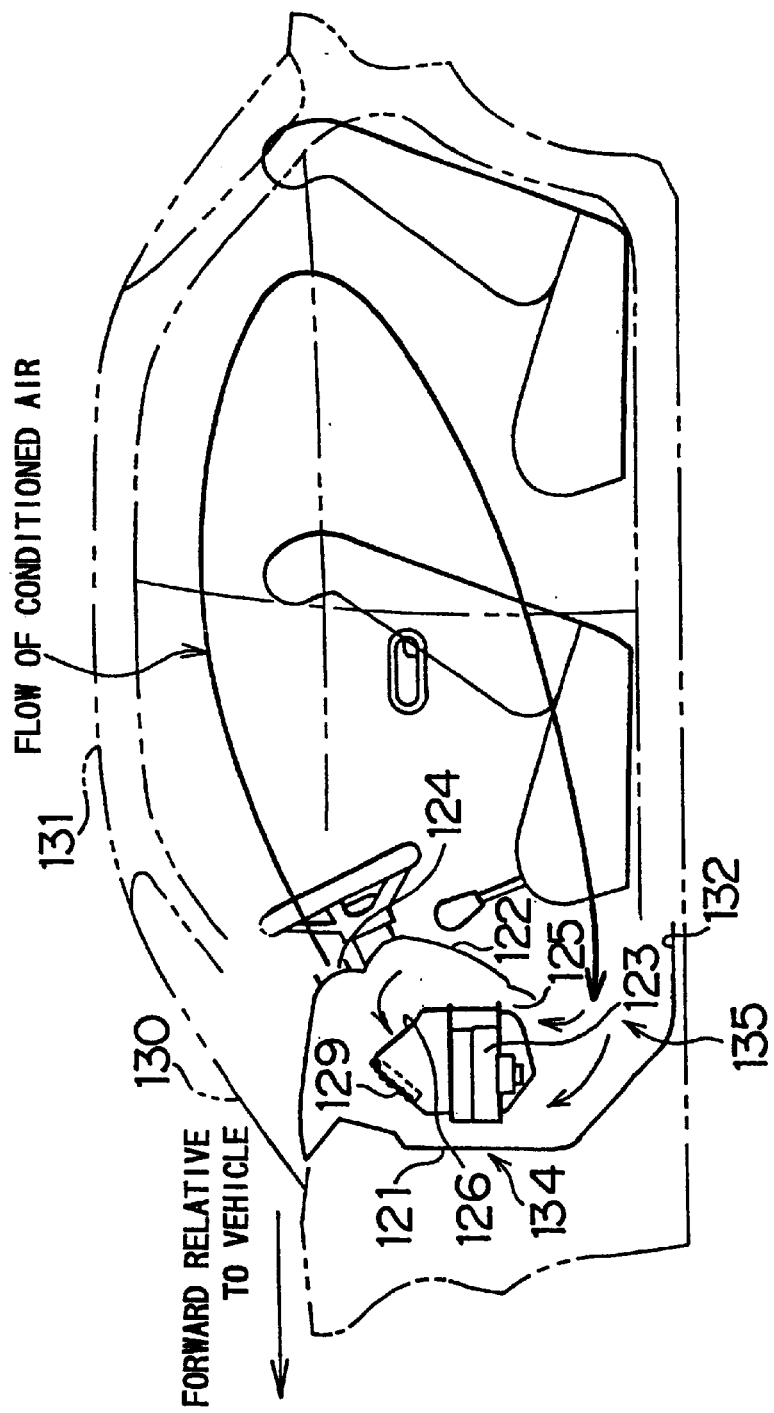
FIG. 16 is an estimated diagram schematically illustrating a vehicular air-conditioning apparatus according to the related art and a section of a vehicle in which the vehicular air-conditioning apparatus is disposed.

A tenth embodiment of the invention will be described with reference to FIG. 15. FIG. 15 is a schematic diagram of a vehicular air-conditioning apparatus in accordance with the tenth embodiment of the invention and a section of a vehicle in which the vehicular air-conditioning apparatus is disposed. As shown in FIG. 15, an engine room 14 and a passenger compartment 15 are separated by a dash panel 1. A floor 12 extends below the dash panel 1. A roof that is not shown in the drawing is disposed above the dash panel 1 via a front window 10. An instrument panel 2 is disposed from the dash panel 1 toward a passenger compartment 15-side. A passenger compartment internal air suction opening 5 and a defroster nozzle blowout opening 16 are formed in an upper portion of the instrument panel 2. The instrument panel 2 is disposed so that a predetermined space is provided between the instrument panel 2 and an occupant (not shown).

A lower portion of the instrument panel 2 is covered with a cover 13. The cover 13 has an opening 36 between a cover end portion 13*a* and a cover end portion 13*b*.

A blower unit 3 and an air-conditioner unit (not shown) are disposed within the instrument panel 2. The blower unit 3 is disposed so as to contact the opening 36 of the cover 13, and a subsidiary internal suction opening 37 is set so as to connect to the inside of the passenger compartment 15 via the opening 36.

The blower unit 3 has a main internal air suction opening 34 in a portion of the blower unit 3 that is upward and rearward with respect to the vehicle. The blower external air suction opening 9 is connected to the engine room 14 via an external air introducing duct 35. The blower unit 3 has, at a lower end thereof, a first blower 38 and a second blower 39, and functions as an internal/external two-layer airconditioner.

The operation of the tenth embodiment of the invention will be described. During cooling, a first conditioned air (cooling air) coming via the blower unit 3 and the air conditioner unit (not shown) is blown out of a conditioned air blowout opening that is not shown into the passenger compartment 15, so as to cool an upper body of an occupant (not shown). After that, the first conditioned air is sucked into the passenger compartment internal air suction opening 5 formed in an upper portion of the instrument panel 2, and then is sucked into the blower unit 3. Due to the aforementioned sequential flow of the first conditioned air as indicated in the drawing, cooling is performed mainly around an occupant's upper body. During cooling, the subsidiary internal suction opening 37 is closed.

During heating, the subsidiary internal suction opening 37 is opened, so that a second conditioned air, that is, warm internal air around the feet of an occupant, is taken into the subsidiary internal suction opening 37.

According to the above-described vehicular air-conditioning apparatus in accordance with the tenth embodiment of the invention, the passenger compartment internal air suction opening 5 is disposed so that during cooling, the first conditioned air (cooling air) is circulated around an occupant's upper body. Therefore, the occupant's upper body can be effectively cooled. During heating, the second conditioned air (warm internal air around feet) is taken into the subsidiary internal suction opening 37, so that the heat load can be reduced. As a result, the vehicular air-conditioning apparatus in accordance with the tenth embodiment of the invention allows quick cooling and heating and a reduction in the heat load while achieving a reduction in the ventilation loss and an anti-frost characteristic, which are essential functions of an internal/external two-layer airconditioner.

In the vehicular air-conditioning apparatus in accordance with the tenth embodiment of the invention, the cover 13 is mounted on a lower face of the instrument panel 2, and during cooling the subsidiary internal suction opening 37 is closed. Therefore, the apparatus is able to prevent suction of conditioned air via the lower face of the instrument panel 2, and is able to reduce the flow of the first conditioned air around a lower body of an occupant, and is able to achieve more air streams around an upper body of the occupant, and is able to reduce the cooling heat load.

It is noted that the particular arrangements of the internal air suction opening as described in the third to eighth embodiment with reference to FIGS. 3 to 13 can also be applied to the tenth embodiment. Further, the internal air suction openings according to FIGS. 3 to 13 can be combined with a cover 13 as shown in FIG. 1 as well as with a shield shown in FIG. 2.

What is claimed is:

1. A vehicular air-conditioning apparatus that is applied to a vehicle in which an engine room and a passenger compartment are separated by a dash panel, comprising:
   a conditioned air blowout opening that is opened at a side of the passenger compartment; and
   a passenger compartment internal air suction opening that is opened at a side of the passenger compartment,
   wherein the passenger compartment internal air suction opening is disposed so that conditioned air is mainly circulated around an occupant's upper body, and wherein the passenger compartment internal air suction opening formed of a partially open side wall of a meter cluster.

2. A vehicular air-conditioning apparatus according to claim 1, wherein the passenger compartment internal air suction opening opens towards a front window shield.

3. A vehicular air-conditioning apparatus according to claim 1, wherein the side wall having said passenger compartment internal air suction opening faces a front window shield.

4. A vehicular air-conditioning apparatus according to claim 1, wherein the passenger compartment internal air suction opening is disposed at a forward side of said meter cluster with respect to a forward driving direction of the vehicle.

5. A vehicular air-conditioning apparatus according to claim 4, wherein the passenger compartment internal air suction opening is partly defined by an upper part of an instrument panel and an upper part of said meter cluster, and wherein said upper part of said meter cluster overlaps said upper part of the instrument panel at least in a longitudinal direction of the vehicle, so that the passenger compartment internal air suction opening is not visible as a reflection in the front window shield.

6. A vehicular air-conditioning apparatus according to claim 1, wherein the conditioned air blowout opening is provided below the passenger compartment internal air suction opening.

7. A vehicular air-conditioning apparatus according to claim 1, wherein the passenger compartment internal air suction opening is disposed so as to open in at least one inner face of said meter cluster.

8. A vehicular air-conditioning apparatus according to claim 7, wherein said inner face is an upper inner face in the vertical direction of the vehicle.

9. A vehicular air-conditioning apparatus according to claim 7, wherein said inner face is an inner side face in the width direction of the vehicle.

10. A vehicular air-conditioning apparatus according to claim 1, wherein the passenger compartment internal air suction opening is disposed in an area, the view of which area from an eye point of the driver via reflection on a front window shield is blocked by rearview mirror.

11. A vehicular air-conditioning apparatus according to claim 1, wherein a cover is mounted on a lower face of an instrument panel.

12. A vehicular air-conditioning apparatus according to claim 1, wherein the passenger compartment internal air suction opening and a blower internal air suction opening are connected and an intake passage is shielded air present in an instrument panel from entering the intake passage.

13. A vehicular air-conditioning apparatus according to claim 1, wherein the passenger compartment internal air suction opening is arranged in a substantially central portion of an instrument panel with respect to a width direction of the vehicle.

14. A vehicular air-conditioning apparatus that is applied to a vehicle in which an engine room and a passenger compartment are separated by a dash panel, comprising:

a conditioned air blowout opening that is opened at a side of the passenger compartment; and a passenger compartment internal air suction opening that is opened at a side of the passenger compartment, wherein the passenger compartment internal air suction opening is provided in an upper portion of an instrument panel, and wherein the passenger compartment internal air suction opening is formed of a partially open side wall of a meter cluster.

15. A vehicular air-conditioning apparatus according to claim 14, wherein the passenger compartment internal air suction opening opens towards a front window shield.

16. A vehicular air-conditioning apparatus according to claim 14, wherein the side wall having said passenger compartment internal air suction opening faces a front window shield.

17. A vehicular air-conditioning apparatus according to claim 14, wherein the passenger compartment internal air suction opening is disposed at a forward side of said meter cluster with respect to a forward driving direction of the vehicle.

18. A vehicular air-conditioning apparatus according to claim 17, wherein the passenger compartment internal air suction opening is partly defined by an upper part of an instrument panel and an upper part of said meter cluster, and wherein said upper part of said meter cluster overlaps said upper part of the instrument panel at least in a longitudinal direction of the vehicle, so that the passenger compartment internal air suction opening is not visible as a reflection in the front window shield.

19. A vehicular air-conditioning apparatus according to claim 14, wherein the conditioned air blowout opening is provided below the passenger compartment internal air suction opening.

20. A vehicular air-conditioning apparatus according to claim 14, wherein the passenger compartment internal air suction opening is disposed so as to open in at least one inner face of said meter cluster.

21. A vehicular air-conditioning apparatus according to claim 20, characterized in that said inner face is an upper inner face in the vertical direction of the vehicle.

22. A vehicular air-conditioning apparatus according to claim 20, characterized in that said inner face is an inner side face in the width direction of the vehicle.

23. A vehicular air-conditioning apparatus according to claim 14, wherein the passenger compartment internal air suction opening is disposed in an area, the view of which area from an eye point of the driver via reflection on a front window shield is blocked by rearview mirror.

24. A vehicular air-conditioning apparatus according to claim 14, wherein a cover is mounted on a lower face of an instrument panel.

25. A vehicular air-conditioning apparatus according to claim 14, wherein the passenger compartment internal air suction opening and a blower internal air suction opening are connected and an intake passage is shielded air present in an instrument panel from entering the intake passage.

26. A vehicular air-conditioning apparatus according to claim 14, wherein the passenger compartment internal air suction opening is arranged in a substantially central portion of an instrument panel with respect to a width direction of the vehicle.

27. A vehicular air-conditioning apparatus that is applied to a vehicle in which an engine room and a passenger compartment are separated by a dash panel, comprising:

a conditioned air blowout opening that is opened at the side of the passenger compartment; and a passenger compartment internal air suction opening that is opened at the side of the passenger compartment, wherein the passenger compartment internal air suction opening is provided in an upper portion of an instrument panel, wherein the passenger compartment internal air suction opening is formed by a plurality of suction holes provided in an upper surface of an instrument panel, and wherein the suction holes are inclined away from a defroster opening arranged between said suction holes and a front window shield.

* * * * *

UNITED STATES PATENT AND TRADEMARK OFFICE
CERTIFICATE OF CORRECTION

PATENT NO. : 6,796,894 B1
DATED : September 28, 2004
INVENTOR(S) : Takayoshi Matsuno et al.

It is certified that error appears in the above-identified patent and that said Letters Patent is hereby corrected as shown below:

Column 14,
Lines 2 and 5, change "characterized in that" to -- wherein --.

Signed and Sealed this

Twenty-eighth Day of December, 2004

JON W. DUDAS
*Director of the United States Patent and Trademark Office*

UNITED STATES PATENT AND TRADEMARK OFFICE
CERTIFICATE OF CORRECTION

PATENT NO. : 6,796,894 B1
DATED : September 28, 2004
INVENTOR(S) : Takayoshi Matsuno et al.

It is certified that error appears in the above-identified patent and that said Letters Patent is hereby corrected as shown below:

Column 12,
Line 61, after "shielded" insert -- to prevent --;

Column 14,
Line 18, after "shielded" insert -- to prevent --.

Signed and Sealed this

Second Day of August, 2005

JON W. DUDAS
*Director of the United States Patent and Trademark Office*